United States Patent
Linsenmaier et al.

(10) Patent No.: US 8,031,224 B2
(45) Date of Patent: Oct. 4, 2011

(54) CAMERA SYSTEM, METHOD FOR OPERATION OF A CAMERA SYSTEM AND SENSOR DEVICE OF A CAMERA SYSTEM

(75) Inventors: Frank Linsenmaier, Weinstadt (DE); Oliver Eder, Wiernsheim-Pinache (DE); Bernd Mack, Remshalden (DE)

(73) Assignee: SMR Patents S.a.r.l., Luxembourg (LU)

( * ) Notice: Subject to any disclaimer, the term of this patent is extended or adjusted under 35 U.S.C. 154(b) by 1056 days.

(21) Appl. No.: 11/853,941

(22) Filed: Sep. 12, 2007

(65) Prior Publication Data
US 2008/0088702 A1 Apr. 17, 2008

(30) Foreign Application Priority Data
Sep. 14, 2006 (DE) .................. 10 2006 044 786

(51) Int. Cl.
*H04N 7/18* (2006.01)
*G06F 15/16* (2006.01)
(52) U.S. Cl. ........................ 348/118; 348/187
(58) Field of Classification Search .................. 348/113, 348/118, 119, 187, 192
See application file for complete search history.

(56) References Cited

U.S. PATENT DOCUMENTS

| | | | |
|---|---|---|---|
| 6,072,575 A * | 6/2000 | Loll | 356/239.4 |
| 6,905,573 B2 * | 6/2005 | Maenpaa et al. | 162/199 |
| 6,940,554 B2 | 9/2005 | Robins et al. | |
| 2004/0035540 A1 * | 2/2004 | Menp et al. | 162/199 |
| 2006/0163458 A1 * | 7/2006 | Reime | 250/227.25 |
| 2006/0232773 A1 * | 10/2006 | Barton et al. | 356/338 |

FOREIGN PATENT DOCUMENTS

DE 41 32 425 4/1992

* cited by examiner

*Primary Examiner* — Zarni Maung
(74) *Attorney, Agent, or Firm* — Reising Ethington P.C.

(57) ABSTRACT

The invention concerns a camera system, especially a camera system in a camera-based analysis system and/or assistance system of a vehicle, comprising a camera with an optical beam path (12), which has at least one optical element to guide image information to a light-sensitive image sensor (14). At least one test beam (22) can be coupled into a transparent test element (30) arranged on the input side in front of beam path (12) and, depending on a degree of soiling of the test element (30), at least one partial beam (24) indicating soiling can be directed from the test element (30) onto a sensor (14a) to receive the partial beam (24) indicating soiling.

22 Claims, 4 Drawing Sheets

CAMERA SYSTEM, METHOD FOR OPERATION OF A CAMERA SYSTEM AND SENSOR DEVICE OF A CAMERA SYSTEM

The invention concerns a camera system, a method for operation of a camera system and sensor device for a camera system according to the preamble of the independent claims.

It is known to use cameras in assistant systems of vehicles to record the surroundings of the vehicle, for example. During poor vision conditions in the surroundings of the vehicle the contrast of the recorded images is often insufficient. The problem then is that poor vision conditions cannot be distinguished from mere soiling of the camera. During operation the degree of soiling can also vary. Calculation algorithms of ordinary software that evaluates the image information of the camera, however, can only recognize continuously increasing soiling with severe limitations.

The task of the invention is to provide a camera system and a method for operation of a camera system with which soiling of the camera can be recognized. A sensor device for this purpose is also to be devised.

The task is solved by the features of the independent claims. Advantageous embodiments are the object of additional claims.

The camera system according to the invention, especially a camera system in a camera-based analysis system and/or assistance system of a vehicle, includes a camera with an optical beam path having at least one optical element to guide image information to a light-sensitive image sensor. At least one test beam can be coupled at the camera input side into a transparent test element arranged in front of the beam path. At least one test beam indicating contamination from the test element can be directed to a sensor to receive the contamination-indicating partial beam, depending on the degree of soiling of the test element. Owing to the fact that the test beam detects soiling on the test element, which is exposed on a camera surface to the surroundings of the camera and therefore possible soiling, a signal that is fed from the surroundings into the camera can be evaluated with respect to the degree of soiling. The test beam is influenced in its intensity, when soiling is present, so that the partial beam sent back to the sensor has an intensity altered by the degree of soiling. For this purpose the test element is expediently designed so that the test beam can be properly coupled, for example, through an appropriate surface structure of the test element. Information via contrast and/or brightness or intensity and/or color information and/or image sharpness is to be understood as image information. The image information is preferably used to perform object recognition or to display an image of the surroundings.

It can therefore be distinguished whether an observed lower contrast of an image recorded by a camera system is due, for example, to fog or smoke or soiling adhering to the camera or test element. If necessary, when soiling is found, a warning to the user of the camera, for example, a vehicle driver, can be given. It is also conceivable that an automatic cleaning procedure of a camera system or the test element is conducted. For example, in a vehicle a wiper can travel over the test element and eliminate the adhering soiling. The test element expediently covers the camera objective so that it is protected from direct soiling. The camera itself can be a so-called CCD camera (charge-coupled device) with a CCD chip as image sensor. This ordinarily consists of thousands of individual cells (pixels) of semiconductor material with which flat image information can be obtained in known fashion. In the simplest case, however, an individual pixel can already be sufficient. Other camera systems, like CMOS cameras and other appropriate light-sensitive sensors, like CMOS sensors (complementary metal oxide semiconductor), PMD sensors (photonic mixer device), LIDAR sensors (light detection and ranging), laser sensors, can also be used. The test beam can advantageously have one or more selected wavelengths to which the sensor reacts with particular sensitivity and/or which are particularly sensitive to soiling.

The sensor to receive the soiling-indicating partial beam can advantageously be a component of the light-sensitive image sensor, which is a component of the camera. An area of the image sensor can then be reserved for the partial beam, optionally specially adapted to the test beam or partial beam wavelength, or the image sensor is operated in time cycles, in which the image sensor records the partial beam in one or more selected time intervals and in the other time intervals the desired image information is recorded. It is favorable if the test beam can be directed to an area of the image sensor, preferably by means of a light guide, which is not essential for the actual image information, for example, to an edge area of the image sensor. The coupling conditions, for example, the angle of incidence on the test element can also be chosen so that output of the partial beam preferably occurs so that overlapping of areas that are essential for the image information and the area that is preferably provided to receive the soiling-indicating partial beams is avoided.

The camera can preferably have an integrated light source to emit the test beam. This permits a particularly compact arrangement. The light source can preferably include at least one LED (light emitting diode). Several LEDs are expediently provided, which are preferably arranged symmetrically around an optical axis of the camera in order to achieve improved resolution and sensitivity.

The test element can expediently be arranged across the optical axis of the optical beam path. The test element can serve as a cover of the camera input and thus simultaneously detect soiling and protect the camera.

The same optical beam path can advantageously be provided for the partial beam as for directing the image information. This provides a further improvement in compactness of the camera system. If the image sensor can be used for evaluation of the partial beam, only the light source(s) and the test element must additionally be present.

Favorably the test element can have low reflection for optical radiation arriving on the test element from the outside. The test element is preferably designed as a flat glass plate or plastic plate with low reflection. For this purpose it can be coated with an appropriate antireflection layer. The plate expediently has an appropriate coupling structure in the inlet area.

Means can advantageously be provided in order to cause activation of the test beam as a function of an image contrast and/or operating parameters of the camera system.

According to a favorable embodiment a computer device is provided in order to evaluate an image signal received from the image sensor with respect to a signal indicating soiling. This task can be carried out by a corresponding device of the camera itself already present, for which purpose the calculation algorithms with which the usual image information received from the image sensor is evaluated can be adapted. If the contrast is poor and if the intensity of the partial beam is altered by soiling, a warning to the user of the camera system and/or cleaning of the camera system or test element can occur.

An advantageous space-saving arrangement is obtained if the light source to emit the test beam is arranged on a sensor board. The circuit board carries the chip of the camera. The light source or also several light sources can be arranged next to the chip.

The one or more light sources to emit the test beam can be arranged in the optical beam path, preferably in a lens arrangement of the camera. It is favorable to arrange it as close as possible to the test element, i.e., close to the optical input of the camera.

It is also possible to couple the radiation of one or more light sources to emit the test beam to a light guide in the test element. The light source can then be positioned with considerable design freedom at an appropriate location without having to consider any constricted space requirements. The appropriate location can even be outside of the camera. Light sources can also be provided on the circuit board, in the beam path and coupling of one or more light sources by light guides or only individual variants for arrangements of the light sources in combination can be provided.

A sensor device of a camera system according to the invention, especially in a camera-based analysis system and/or assistance system of a vehicle, in which the camera includes an optical beam path for directing image information to a light-sensitive sensor, has at least one light source to furnish at least one test beam, a test element to generate a soiling-sensitive partial beam from the test beam and a sensor provided to receive the partial beam that indicates soiling. The sensor arrangement is preferably used in camera systems that furnish information in which sufficient contrast is an important criterion, for example, during object recognition to warn of approaching objects.

The sensor to receive the partial beam that indicates soiling can preferably be a component of a light-sensitive image sensor of the camera.

The test beam can be guidable with a light guide to the test element. The test element is preferably a flat glass or plastic plate with a coupling area for the test beam.

A computer device can be advantageously provided in order to evaluate an image signal received from the image sensor with respect to a signal that indicates soiling. If contrast of the image signal is good, possible soiling can be tolerated. If the contrast is poor and the test element is soiled, the image signal is no longer reliable.

The method according to the invention proposes that at least one test beam is coupled into a transparent test element arranged at the input side in front of the beam path and a test beam indicating soiling, depending on the degree of soiling of the test element, is directed from the test element to a sensor to receive the partial beam indicating soiling and the partial beam is evaluated with respect to its intensity. Soiling of the camera system or the test element can preferably be tolerated as long as the contrast of the image information of the camera system is sufficiently high. As soon as the contrast of the image information is poor, it can be clarified whether this is due merely to soiling of the camera system or whether poor visual conditions are actually present.

The test beam can then preferably be emitted from an established insufficient image contrast. It is also conceivable that the test beam can be emitted as a function of other parameters. Thus, in a vehicle-based system during operation of the windshield wiper and/or fog lamps, when soiling of the camera system might potentially be present, a test beam can be emitted.

In order to be able to consider aging processes of the camera system, a reference value is expediently determined in the unsoiled test element to evaluate the intensity of the partial beam.

It can then be favorable, if an average reference value is formed as the average from a number of consecutively determined reference values to evaluate the intensity of the partial beam. The information content of the partial beam indicating soiling is therefore increased. It is advantageous to always use the same number of reference values, in which the newest reference value replaces the oldest.

An alarm is advantageously tripped, when the intensity of the partial beam lies outside of admissible bandwidth by a stipulated reference value. If the camera system, for example, is a component of a driver assistance system in which object recognition preferably occurs and/or an image of the surroundings is recorded, the driver can be warned that the measurements of the assistance system are no longer reliable, because image recording has become imprecise.

Further advantages and details of the invention will be further explained below by means of preferred practical examples described in the drawing without the invention being restricted to these practical examples.

In the drawing.

Functionally equivalent elements are numbers with the same reference numbers in the figures.

Figure 1:
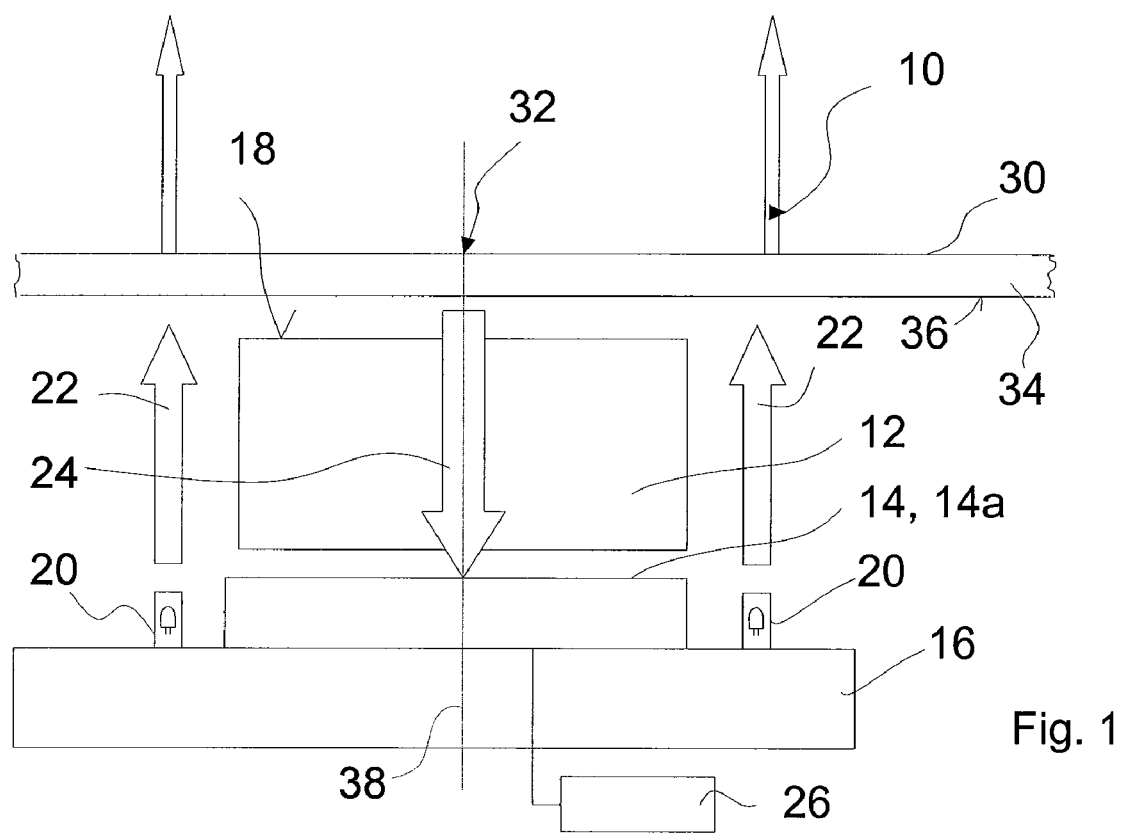
FIG. 1 shows a preferred embodiment of a camera system with a camera and a preferred sensor arrangement to recognize soiling, in the state of performing a calibration measurement.
Figure 2:
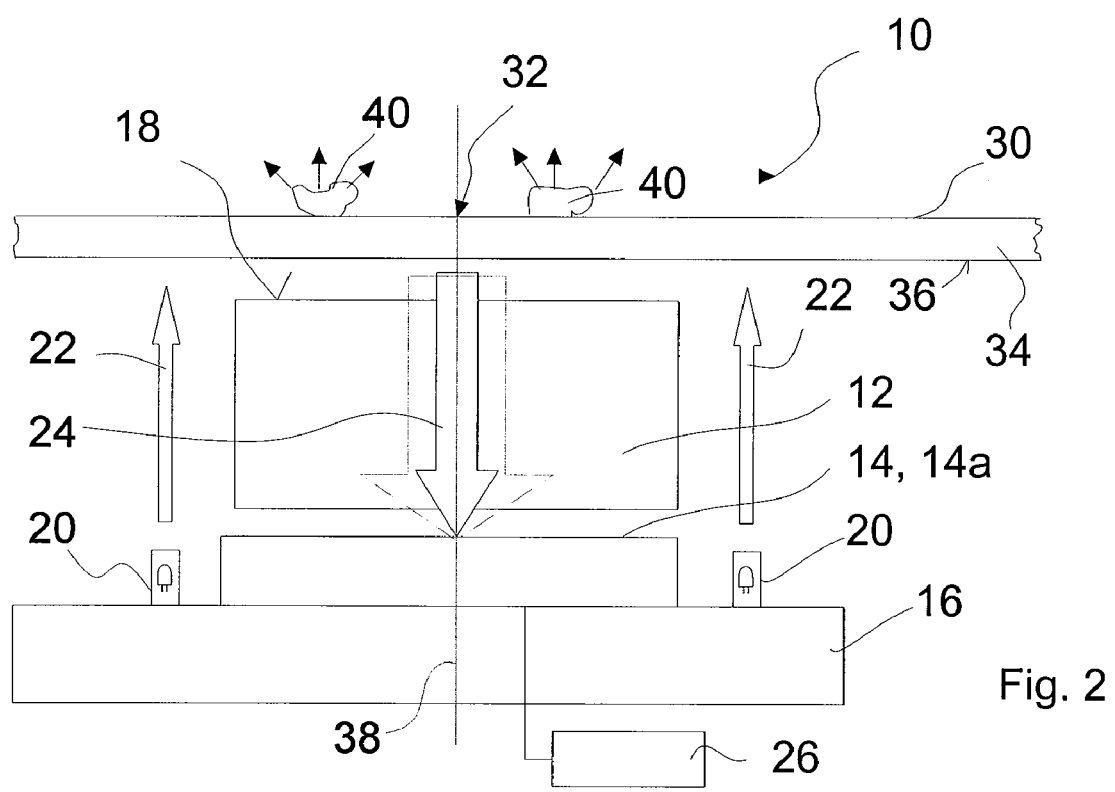
FIG. 2 shows a preferred embodiment of a camera system with a camera and a preferred sensor device for recognition of soiling according to FIG. 1 with applied dirt particles on a test element, in which light sources are arranged on a sensor board of the camera.

FIGS. 1 and 2 explain the invention by means of a first preferred camera system 10, especially a camera system in a camera-based analysis system and/or assistance system of a vehicle.

A schematically depicted camera (not further designated) includes an optical beam path 12 shown very simplified and designed as a lens system to direct image information from an outer area of the camera to a light-sensitive image sensor 14 in the interior of the camera. The image sensor 14 is arranged on a circuit board 16. The camera is designed, for example, as a CCD camera or as a CMOS camera.

The optical beam path 12 has an optical axis 38 arranged perpendicular to circuit board 16 and to image sensor 14. Light entering the camera, in which light is understood to mean light with a wavelength between ultraviolet, visible light and infrared, is received by the image sensor 14. A computer device 26 processes the information and furnishes an image or contrast of the surroundings, which is displayed on a screen (not shown) or which can be processed in some other way.

A test element 30 in the form of a transparent glass or plastic disk with low reflection is arranged at a light inlet side 18 of the camera, which is arranged across the optical axis 38. If the beam path 12 has one or more deflections of the incident radiation or kinks so that a single optical axis is not present, the test element 30 is preferably arranged across the optical axis 38 in the input area of the camera. The test element 30 forms a cover of the camera input and in this way does not interfere with normal functioning of the camera.

Light sources 20 preferably designed as LEDs arranged on both sides of the image sensor 14 emit test beams 22 indicated as arrows, which are directed onto the transparent test element 30 arranged on the input side in front of the beam path 12 and which are coupled there from its back side 36 into the test element 30 in a coupling area (not further shown). The coupled-in radiation can propagate in the internal area 34 of the test area 30 to both sides of its longitudinal extent. Test element 30 is shown in FIG. 1 in a defined, clean state. Without dirt particles on test element 30 a partial beam 24 of the test beams 22 goes to a sensor 14a that indicates soiling, which is preferably identical to image sensor 14. The trapped intensity of the partial beam 24 corresponds to a reference value.

If dirt particles 40 are deposited on its outside, part of the test beam 22 is scattered outward by the dirt particles 40 at the contact sites between dirt particles 40 and test element 30, whereas another part of the test beam 22 forms a partial beam 24, which enters the lens system of the optical beam path 12 and is directed to a sensor 14a that indicates soiling, which is preferably identical to image sensor 14. This is shown in FIG. 2.

The partial beam 24 is more strongly changed in its intensity when more soiling adheres to the test element 30 and changes less when less soiling adheres to test element 30. The intensity of the partial beam 24 is an indication of the degree of soiling, which is expediently determined by calibration measurements and can be made available for evaluation purposes to calculation device 26. The intensity of the partial beam 24 can then increase or diminish relative to the reference value, depending on the type of soiling, which is indicated by two different arrow thicknesses of the partial beam 24.

To increase the accuracy an average value formation of several reference is expediently carried out. The average value or the reference value can be entered in the computer device 26. Aging effects of the beam path 12 and/or image sensor 14, 14a can be compensated by this. Reference value determination can be conducted, for example, during each vehicle start or each start of the camera system 10 or at stipulated time intervals, for example, after a certain number of operating hours of camera system 10.

Light that enters the beam path 12 in an area 32 of the test element 30 arranged in front of the camera input can be trapped by sensor 14a. The partial beam 24 indicating the soiling can impinge on sensor 14a or 14. The brightness or intensity of the partial beam 24 is representative of the degree of soiling on the outside of test element 30. If the change in intensity of the test beam 24 is low, little or no soiling is present. If poor contrast of the camera system is then established, it can be evaluated that the visual conditions were poor. If, however, poor contrast is determined and the change of intensity of the partial beam 24 relative to its reference value is greater than a tolerable deviation, soiling of the camera system 10 or test element 30 is present. The user of the camera system 10 then expediently receives a warning that the camera system 10 is now operating suboptimally.

The computer device 26 evaluates the intensity of the returning partial beam 24 and can therefore evaluate an image signal received from image sensor 14 with respect to a signal indicating soiling and/or trigger a warning signal to the user of the camera.

Figure 3:
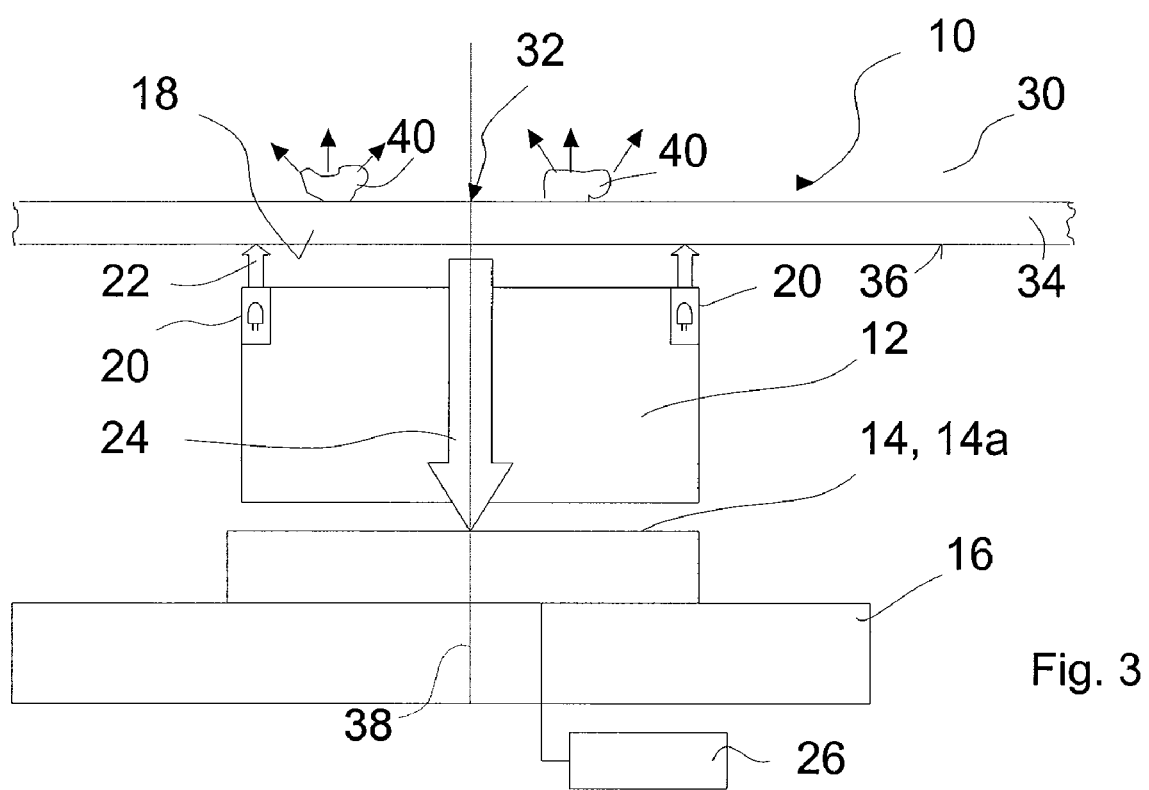
FIG. 3 shows another preferred embodiment of a camera system with a camera and a sensor device for recognition of soiling in which light sources are arranged in a lens system of the camera.

FIG. 3 illustrates a variant of a preferred camera system 10 in which light sources 20 are integrated to emit the test beam 22 into the optical beam path 12. The design of the system largely corresponds to that of FIG. 1, which is referred for a further description of common elements.

Light sources 20 are positioned close to the entry area on the inlet side 18 of the camera and therefore adjacent to test element 30. The light sources 20 preferably designed as LEDs emit strongly bundled radiation indicated as arrows, so that no or virtually no radiation loss is observed.

Figure 4:
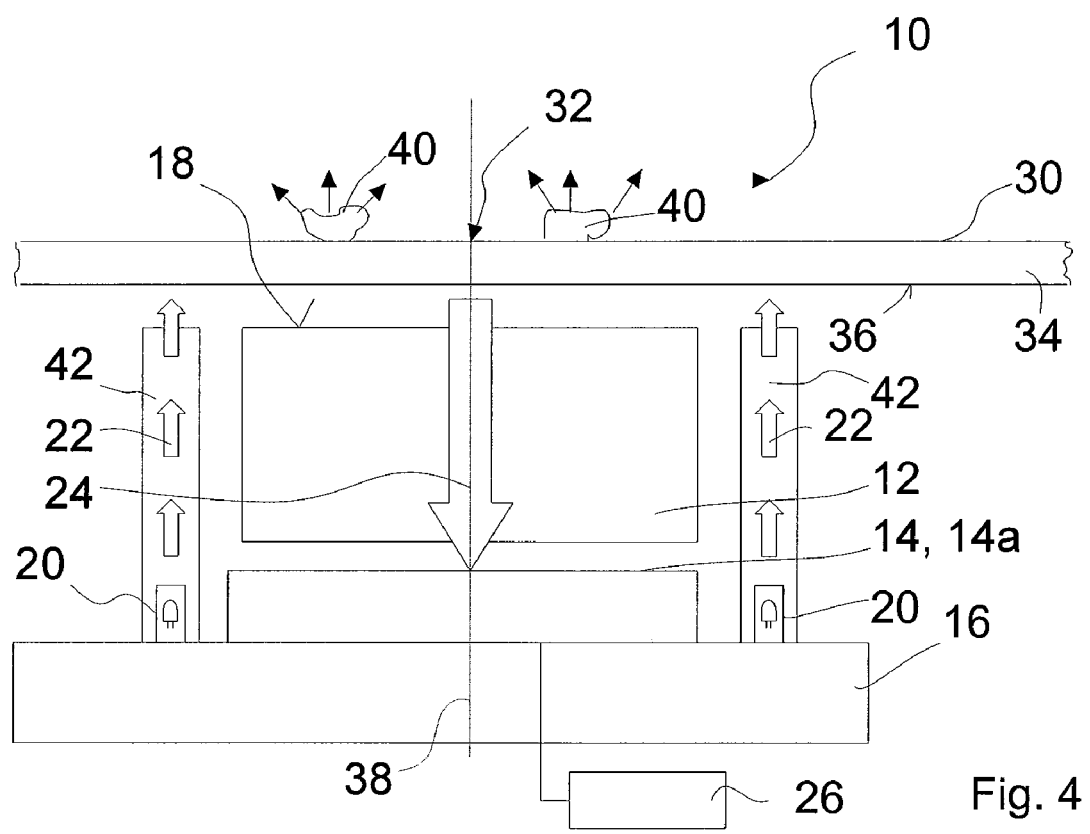
FIG. 4 shows another preferred embodiment of a camera system with a camera and a sensor device to recognize soiling, in which light sources are coupled into a test element with a light guide.

The practical example depicted in FIG. 4 shows a variant that can be provided as an alternative or in combination with one or both of the practical examples just described. Here again the embodiment is largely comparable to the practical examples already described, which are referred to in order to avoid needless repetitions in explaining the common elements.

The light sources 20 to emit the test beams 22 are arranged on the sensor board 16 on both sides of image sensor 14, 14a, in which the test beam 22 is coupled into the test element 30 with a light guide 42.

The sensor device of the camera system 10 according to the invention includes a camera with an optical beam path 12 to guide image information to a light-sensitive sensor 14, in which at least one light source 20 is provided to furnish at least one test beam 22, to the test element 30 to generate the partial beam 24 sensitive to soiling from the test beam 22 and a sensor 14a to receive the partial beam 24 indicating soiling.

REFERENCE NUMBERS

10 Camera system
12 Beam path
14 Sensor
14a Sensor
16 Circuit board
18 Inlet side
20 Light source
22 Test beam
24 Partial beam
26 Computer device
30 Test element
32 Coupling out area
34 Internal space
36 Back side
38 Optical axis
40 Dirt particles
42 Light guide

The invention claimed is:

1. Camera system, especially a camera system in a camera-based analysis system and/or assistance system of a vehicle, comprising a camera with an optical beam path (12), which has at least one optical element to guide image information to a light-sensitive image sensor (14), and at least one test beam (22) coupled into a transparent test element (30) arranged on the input side in front of the beam path (12) and, depending on a degree of soiling of the test element (30), at least one partial beam (24) indicating soiling can be directed from the test element (30) to a sensor (14a) to receive the partial beam (24) indicating soiling.

2. Camera system according to claim 1, wherein the light-sensitive image sensor (14) includes a sensor (14a) to receive the partial beam (24) indicating soiling.

3. Camera system according to claim 2, wherein an integrated light source (20) emits the test beam (22).

4. Camera system according to claim 3 wherein the light source (20) includes an LED.

5. Camera system according to claim 4 wherein the test element (30) is arranged across an optical axis (38) of the optical beam path (12).

6. Camera system according to claim 5 wherein the same optical beam path (12) is provided for the partial beam (24) as for guiding the image information.

7. Camera system according to claim 6 wherein the test element (30) has low reflection for light incident from outside on the test element (30).

8. Camera system according to claim 7 including means are provided to cause activation of the test beam (22), depending on an image contrast or operating parameters of the camera system.

9. Camera system according to claim 7 including a computer device (26) to evaluate an image signal received from image sensor (14) with respect to a signal indicating soiling.

10. Camera system according to claim 9 wherein the light source (20) to emit the test beam (22) is arranged on a sensor board (16).

11. Camera system according to claim 10 wherein the light source (20) to emit the test beam (22) is arranged in an optical beam path (12).

12. Camera system according to claim 10 including a light guide (42) to couple the test beam (22) into the test element (30).

13. Sensor arrangement of the camera system, especially in a camera-based analysis system and/or assistance system of a vehicle in which the camera includes an optical beam path (12) to guide image information to a light-sensitive sensor (14) including at least one light source (20) to produce at least one test beam (22), a test element (30) to generate a soiling-sensitive partial beam (24) from the test beam (22) and a sensor (14a) to receive the partial beam (24) indicating soiling.

14. Sensor device according to claim 13 wherein said light-sensitive sensor (14) includes said sensor (14a) as a component thereof, said sensor (14a) receives the partial beam (24) indicating soiling.

15. Sensor device according to claim 14 including a light guide (42) for guiding the test beam (22) to the test element (30).

16. Sensor device according to claim 15 including a computer device (26) to evaluate an image signal received from said image sensor (14) with respect to a signal indicating soiling.

17. Method for operation of a camera system especially in a camera-based analysis system and/or assistance system of a vehicle in which the camera including a sensor device coupling at least one test beam (22) into a transparent test element (30) arranged on the input side in front of beam path (12) and, collecting at least one partial beam (24) by a sensor (14a) from the test element (30) by receiving a partial beam (24) indicating soiling, whereby the partial beam (24) is evaluated with respect to its intensity.

18. Method according to claim 17 wherein the step of emitting the test beam (22) is a function of the established image contrast.

19. Method according to claim 18 wherein the step of emitting the test beam (22) is a function of the operating parameters of the camera system.

20. Method according to claim 19 including the step of comparing the intensity of the partial beam (24) to a reference value based on an unsoiled test element (30).

21. Method according to claim 20 including the step of averaging a number of consecutively determined reference values to create an average reference to evaluate the intensity of partial beam (24).

22. Method according to claim 21 including the step of tripping an alarm when the intensity of the partial beam (24) lies outside an admissible bandwidth by a stipulated reference value.

* * * * *